United States Patent [19]

Weiss

[11] 4,126,664
[45] Nov. 21, 1978

[54] STABILIZED CYANAMIDE SOLUTIONS

[75] Inventor: Stefan Weiss, Trostberg, Germany

[73] Assignee: Süddeutsche Kalkstickstoff-Werke Aktiengesellschaft, Trostberg, Germany

[21] Appl. No.: 829,627

[22] Filed: Sep. 1, 1977

[30] Foreign Application Priority Data

Sep. 18, 1976 [DE] Fed. Rep. of Germany ....... 2642023

[51] Int. Cl.$^2$ ................................................. C01C 3/16
[52] U.S. Cl. ..................................... 423/265; 423/369
[58] Field of Search ............... 423/265, 368, 369, 268; 252/397, 399, 407; 560/265

[56] References Cited

U.S. PATENT DOCUMENTS 3,295,926  1/1967  Janes et al. ........................... 423/369

FOREIGN PATENT DOCUMENTS

| 122,742 | 2/1959 | U.S.S.R. | 423/368 |
| 216,669 | 7/1968 | U.S.S.R. | 423/265 |
| 274,106 | 9/1970 | U.S.S.R. | 423/368 |
| 295,398 | 3/1972 | U.S.S.R. | 423/368 |

Primary Examiner—O. R. Vertiz
Assistant Examiner—Thomas W. Roy
Attorney, Agent, or Firm—Hans Berman

[57] ABSTRACT

The storage stability of strong or concentrated, aqueous solutions of cyanamide, even those conventionally stabilized with acid, is enhanced by small amounts of lower alkyl esters of carboxylic acids having preferably a $pK_a^{25°}$ value of 3.8 or less.

9 Claims, No Drawings

STABILIZED CYANAMIDE SOLUTIONS

This invention relates to aqueous solutions of cyanamide (carbodiimide, $CH_2N_2$), and particularly to cyanamide solutions having improved storage stability.

Cyanamide solutions, usually containing 50% by weight of the technical grade, are staple articles of commerce and inexpensive starting materials for the synthesis of agricultural and pharmaceutical chemicals. The solutions as such also are employed in agriculture. Solutions containing between 20% and 80% cyanamide combine the advantages of low first cost and relatively low weight per unit weight of cyanamide which permits shipment over large distances at reasonable cost.

However, solutions of chemically pure cyanamide as well as of the commerical, technical grade are not stable, and tend to decompose particularly quickly at temperatures above 20° C. The main decomposition product is urea if the pH of the solution is below 3 or above 12. Dimerization to di-cyanodiamide prevails at pH 8 to 10. Cyanamide solutions are most stable between pH 3 and pH 5, and it is known to adjust the usually more alkaline solutions of cyanamide to a preferred pH value of 4.5 with phosphoric, sulfuric, aceticm or boric acid. The conventionally stabilized solutions do not show a substantial reduction in cyanamide content for about six months if stored at 10° to 20° C.

It is the primary object of this invention to provide strong or concentrated, aqueous cyanamide solutions which are stable for longer periods, even at higher temperatures than those in present use.

It has been found that the stability in storage of aqueous solutions containing approximately 20% to 80% cyanamide are substantially enhanced by the presence of small but effective amounts, 0.03% to 1%, of dissolved carboxylic acid alkyl esters with or without conventional stabilizers. The alcohol moieties of the esters employed contain up to 8, preferably up to 6 carbon atoms, the carbon content of the acid moiety being limited largely by the requirement for solubility in water. Best results are obtained with esters of aliphatic carboxylic acids having $pK_a^{25°}$ values of 3.8 or less, the $pK_a^{25°}$ value of formic acid being 3.8.

Esters of formic acid are preferred because of their effectiveness, ready availability, and low cost at the minimal concentrations required. The amounts of formate required for optimal stabilizing effect decrease with the number of carbon atoms in the alcohol moiety from amyl formate to methyl formate and are between 0.1% and 0.5% based on the weight of the cyanamide solution. Best results are acheived with n-propyl formate. The optimum amount of decomposition-inhibiting ester varies with the concentration, the properties, and the past history of the cyanamide solution to be stabilized, also with the expected storage temperature and other variables, and must be determined experimentally for each set of conditions within the limits indicated above. There is a distinct peak in the stabilization effect at a narrowly defined amount of ester, and an excess of ester is to be avoided.

The stabilizing effects of esters of the invention, more specifically of the preferred formic acid esters on technical grades of cyanamide are enhanced by adjusting the pH of the solutions to a value of 3 to 5, preferably to 4.5, by means of a mineral acid, phosphoric acid being preferred. However, the stability of chemically pure cyanamide in water protected by carboxylic acid esters according to this invention cannot be further improved by a pH adjustment.

The esters of other aliphatic carboxylic acids having a $pK_a^{25°}$ value of less than 3.8 are similarly effective as those of formic acid. They include the esters of methoxyacetic acid, the several haloacetic acids, α-chloropropionic acid, and cyanoacetic acid which are employed at concentrations of 0.03% to 0.3% to best advantage, the optimal concentrations requiring experimental tests, and an excess being usually to be avoided. In view of their higher cost and in the absence of compensating advantages, the last-mentioned acids cannot profitably replace formic acid.

Esters of acetic acid and of its higher homologs, as far as adequately soluble in the cyanamide solutions have a distinct stabilizing effect on cyanamide solutions when employed in amounts of 0.2 to 1.0% by weight. They are generally less effective than the formic acid esters, but their performance may be improved by the presence of enough mineral acid, such as phosphoric acid, to lower the pH of the solution to the range between 3 and 4.

The stabilizing effect is not limited to esters of monocarboxylic acids. The lower alkyl esters of oxalic and malonic acids are effective, though not economically attractive at this time.

The esters of the invention appear to inhibit dimerization of cyanamide to dicyanodiamide, even at temperatures somewhat higher than ordinary room temperature of 20° C.

The following Examples are further illustrative of the invention. All percentage values in the Examples are by weight unless stated otherwise.

EXAMPLE 1

A commerically available, technical grade of cyanamide was dissolved in water in an amount to produce a 50% solution. Two batches of this solution were stored at a constant temperature of 20° C without pH adjustment. In one batch, 0.125% ethyl formate was dispersed uniformly. After 180 days, the solution containing ethyl formate still was found to contain 49.1% cyanamide, whereas the cyanamide content of the untreated solution had dropped to less than 34%. No cyanamide could be detected in the untreated solution after 360 days of storage, whereas the treated solution contained 48.1% cyanamide.

EXAMPLE 2

Two batches of aqueous 50% cyanamide solution were prepared from chemically pure cyanamide. One batch additionally received 0.5% n-amyl formate. Neither batch was adjusted for pH. No cyanamide could be detected in the untreated solution after 180 days storage at 20° C, whereas the treated solution still contained 49.3% cyanamide after 180 days, and 48.6% cyanamide after 360 days.

EXAMPLE 3

Four batches of aqueous 50% cyanamide solution were prepared from the commercial, technical grade and adjusted with phosphoric acid to pH 4.5. Three of the batches were mixed with 0.25% n-propyl formate, n-butyl formate, and n-amul formate respectively before the pH adjustment.

After 90 days storage at 20° C, the batch conventionally stabilized with acid alone still contained 48.8% cyanamide, whereas the three formate-bearing solutions contained 49.4, 49.7, and 49.8% cyanamide. After 180 days, the control contained 46.8% cyanamide, the solutions according to the invention 48.8, 49.3, and 49.2%. After 360 days, the cyanamide content of the control had dropped to less than 39%, whereas the formate-stabilized solutions still contained 47.6, 47.2, 46.9%. After 450 days, the control contained less than 30% cyanamide, whereas the solution stabilized with n-propyl formate contained 46.3%. The other two solutions were discarded after 360 days.

EXAMPLE 4

Four batches of aqueous 50% solution were prepared from commerical, technical cyanamide and adjusted to pH 4.5 as in Example 3. 0.25%, 0.5%, and 1.0% n-propyl formate were added to three batches respectively. After 210 days of storage at 20° C, the control still contained 46.0% cyanamide, and the formate bearing solutions respectively contained 48.6%, 47.1% and 41.2%, the amount of residual cyanamide decreasing with increasing propyl formate.

After 360 days, the cyanamide content of the control and of the solution containing 1.0% n-propyl formate had dropped below 39.0%, whereas the solutions stabilized with lower concentrations of formate still contained 47.6% and 45.5%.

EXAMPLE 5

A 50% solution of commerical, crystalline cyanamide, unadjusted for pH, was divided into four batches of which two received 0.125% ethyl formate. One formate-bearing batch and one control were stored at 25° C, the other pair at 30° C.

After 210 days at 25° C, the control contained less than 15% cyanamide, the treated catch 47.7%. After 150 days at 30° C, the control contained less than 15%, the treated batch 46.2% cyanamide.

EXAMPLE 6

The procedure of Example 3 was repeated, but the several batches of cyanamide solution were stored at 30° C and were assayed for cyanamide content after 30, 60, and 90 days. The results are tabulated below.

TABLE I

| Days | Cyanamide Content, Percent | | | |
|---|---|---|---|---|
| at 30° C | Control | Pr.form. | Bu.form. | Am.form |
| 30 | 48.4 | 49.7 | 49.5 | 49.7 |
| 60 | 44.1 | 49.3 | 48.9 | 48.9 |
| 90 | <34 | 47.5 | 46.8 | 46.3 |

EXAMPLE 7

Four batches of a 50% solution of a technical grade of cyanamide were adjusted to pH 4.5 as above. Three batches additionally received 0.25% n-propyl formate, 0.5% n-butyl formate, and 0.5% n-amyl formate respectively, the cyanamide content of each batch was determined after 40 and 80 days storage at 40° C. Table II shows the results of the analyses.

TABLE II

| | Cyanamide Content, Percent | | | |
|---|---|---|---|---|
| at 40° C | Control | Pr.form. | Bu.form. | Am. form. |
| 40 | 41.4 | 49.0 | 48.2 | 48.7 |
| 80 | <30 | 45.1 | 45.8 | 43.3 |

EXAMPLE 8

50% Solutions of technical cyanamide were adjusted to pH 4.5 with phosphoric acid. Three batches respectively received 0.05% methyl formate, 0.1% methyl formate, and 0.25% ethyl acetate. When analysed after 270 days storage at 20° C, the control solution still contained 43.6% cyanamide, the two formate-stabilized solutions 47.1% and 47.9% respectively, and the solution stabilized with ethyl acetate 45.3%.

EXAMPLE 9

50% Solutions of technical cyanamide were adjusted to pH 4.5 or pH 3.5 with phosphoric acid, and further received 0.25% ethyl acetate of 0.5% butyl acetate. After 9 months storage at 20° C, the solution stabilized at pH 4.5 with ethyl acetate contained 45.3% cyanamide, the corresponding solution at pH 3.5 46.7% cyanamide. A similar improvement with lower pH from 44.8% to 46.4% was observed with butyl acetate as a stabilizer.

EXAMPLE 10

Technical grade cyanamide was dissolved in water to produce a 60% solution which was adjusted to pH 4.0. Batches of this solution lost cyanamide to less than 50% within 43 days at 25° C, and to less than 30% within 43 days at 30° C. When the solution was further stabilized by addition of 0.3% n-propyl formate, 58.0% cyanamide was still present after 43 days at 25° C, 57.4% after 43 days at 30° C.

EXAMPLE 11

Enough crystalline cyanamide was dissolved in water to produce an 80% solution which had a pH of 6.0. When stored 90 days at 25°, it lost more than one half of its original cyanamide content. After 90 days storage at 30° C, less than 35% cyanamide was found. The same solution, when mixed with 0.1% diethyl oxalate still contained 79.2% cyanamide after 90 days at 25° C, and 77.8% cyanamide after 90 days at 35° C.

EXAMPLE 12

Crystalline cyanamide (technical grade) was dissolved in enough water to produce an 80% solution. It had a pH of 6.0. The solution was divided and one batch was stabilized by addition of 0.1% ethyl chloroacetate. Both solutions were stored 70 days at 30° C. The stabilized solution still contained 72.2% cyanamide, the control less than 40%.

What is claimed is:

1. An aqueous cyanamide solution of improved stability containing 20% to 80% cyanamide by weight, and at least one stabilizer, said one stabilizer being an alkyl ester of a carboxylic acid dissolved in said solution in an amount of 0.03 to 1.0 percent by weight and effective for enhancing the stability of said cyanamide in said solution during extended storage, said alkyl having up to 8 carbon atoms.

2. A solution as set forth in claim 1, wherein said carboxylic acid has a $pK_a^{25°}$ value of not more than 3.8.

3. A solution as set forth in claim 2, wherein said carboxylic acid is formic acid, and the alcohol moiety of said ester has up to five carbon atoms.

4. A solution as set forth in claim 3, wherein said ester is n-propyl formate.

5. A solution as set forth in claim 1, further comprising an amount of a mineral acid sufficient to make the pH value of said solution 3 to 5.

6. A solution as set forth in claim 1, wherein said carboxylic acid has 1 to 3 carbon atoms, and the alcohol moiety of said ester has up to five carbon atoms.

7. A solution as set forth in claim 1, wherein said ester is an alkyl formate soluble in water and containing more than two carbons in the alkyl moiety thereof, said alkyl formate being dissolved in said solution in an amount of 0.2% to 0.3% by weight, the solution containing enough phosphoric acid to have a pH value of 3.5 to 4.5, the concentration of said cyanamide in said solution being approximately 50%.

8. A solution as set forth in claim 1 having a pH value of 4 to 5, said ester being an ester of formic acid and present in said solution in an amount of 0.1 to 0.5%.

9. A solution as set forth in claim 8, wherein said ester is n-propyl formate and present in said solution in an amount of approximately 0.25%.

* * * * *